(12) United States Patent
Cornell

(10) Patent No.: US 6,556,782 B1
(45) Date of Patent: Apr. 29, 2003

(54) CAMERA HAVING VIEWFINDER BOX EXTENDING FROM COVER TO COVER AND ASSEMBLY METHOD

(75) Inventor: David J. Cornell, Scottsville, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 10/225,764

(22) Filed: Aug. 22, 2002

(51) Int. Cl.[7] .................. G03B 17/02; G03B 13/02; G03B 13/06
(52) U.S. Cl. .................. 396/6; 396/373; 396/382
(58) Field of Search .................. 396/6, 373, 382, 396/378, 379, 380, 381; 359/819

(56) References Cited

U.S. PATENT DOCUMENTS

| | | | |
|---|---|---|---|
| 5,353,165 A | | 10/1994 | VanDeMoere et al. |
| 5,905,915 A | * | 5/1999 | Wagner .................. 396/6 |
| 6,112,026 A | * | 8/2000 | Rydelek et al. .................. 396/6 |
| 6,470,145 B1 | * | 10/2002 | Matthias et al. .................. 396/6 |

FOREIGN PATENT DOCUMENTS

| | | |
|---|---|---|
| JP | 1-57722 | 4/1989 |
| JP | 1-57739 | 4/1989 |
| JP | 6-28845 | 4/1994 |
| JP | 9-222696 | 8/1997 |
| JP | 11-344743 | 12/1999 |
| JP | 2000-155391 | 6/2000 |

OTHER PUBLICATIONS

Patent Abstracts of Japan, Publication # 11–316332, Nov. 16, 1999, Fuji Photo Film Co. Ltd., Inventor–Koike Kazumi, Film Unit With Lens.

* cited by examiner

*Primary Examiner*—Alan A. Mathews
(74) *Attorney, Agent, or Firm*—Robert Luke Walker

(57) ABSTRACT

A camera has a capture unit and a body holding the capture unit. The body has a front cover, a rear cover, and an internal cavity disposed between the covers. The body has a viewfinder box extending from an outer surface of one of the covers to an outer surface of the other cover. A viewfinder lens unit is disposed in the viewfinder box.

20 Claims, 8 Drawing Sheets

CAMERA HAVING VIEWFINDER BOX EXTENDING FROM COVER TO COVER AND ASSEMBLY METHOD

FIELD OF THE INVENTION

The invention relates to photography and photographic equipment and more particularly relates to a camera having a viewfinder box extending from cover and assembly method.

BACKGROUND OF THE INVENTION

One time use cameras are subject to a number of competing considerations. Dust contamination is a serious problem that can be reduced by providing a tight fit between individual components. On the other hand, the costs of individual cameras can be reduced by simplifying assembly, decreasing the number of parts, and increasing tolerances.

Japanese patent publication JP 11-316332, published Nov. 16, 1999, discloses a one-time-use camera in which a frame has a viewfinder trough that holds a pair of viewfinder lenses. The front and rear covers have passageways aligned with the viewfinder lenses. The passageways are closed by transparent windows. In another disclosed embodiment, the viewfinder trough is detachable and has one or two pieces. Viewfinder lenses fit in either end. Window pieces fit over the viewfinder lenses. These cameras exclude dust by adding windows that close passageways over viewfinder lenses, but have the shortcoming of using a large number of separate parts.

Some other one time use cameras have a reduced number of viewfinder parts, but require close tolerances for dust exclusion. In these cameras, passageways in one or more covers are closed by respective viewfinder lenses. Japanese patent publication JP 1-57739, published Apr. 11, 1989, discloses a one-time-use camera that combines the viewfinder lenses into a one-piece plastic unit. The completed viewfinder lens unit is held in place within the camera by assembled body components and apparently by hooks on the rear cover. The rear cover has a passageway, through which the user sees the viewfinder. Japanese patent publication JP 11-344743, published Dec. 14, 1999, discloses a one time use camera having a viewfinder lens unit that incorporates front and rear lenses and a bridge that extends between the lenses. U.S. Pat. No. 5,353,165 discloses similar viewfinder lens units, including one that incorporates a keeper plate and other camera features. In these last two patents, a viewfinder lens unit is held in place by an internal camera frame. A pair of covers enclose the frame. Passageways in the covers allow a user to see through the viewfinder. Japanese patent publication JP 1-57722, published Apr. 11, 1989 and Japanese patent publication JP 6-28845, published Apr. 15, 1994 both disclose one time use cameras in which separate front and rear viewfinder lenses are assembled into a track that is part of an L-shaped cross-section front-top cover. A plate is added to the top surface of the front-top cover to enclose the viewfinder. The rear cover of the camera has an opening aligned with the rear element of the viewfinder. A U-shaped rim around the opening bears on the rear viewfinder lens.

It would thus be desirable to provide an improved to provide an improved camera and method in which there are a relatively small number of viewfinder parts and dust exclusion from the interior of the camera is not a function of the fit between viewfinder lenses and respective covers.

SUMMARY OF THE INVENTION

The invention is defined by the claims. The invention, in its broader aspects, provides a camera and assembly method. The camera has a capture unit and a body holding the capture unit. The body has a front cover, a rear cover, and an internal cavity disposed between the covers. The body has a viewfinder box extending from an outer surface of one of the covers to an outer surface of the other cover. A viewfinder lens unit is disposed in the viewfinder box.

It is an advantageous effect of the invention that an improved camera and method are provided, in which there are a relatively small number of viewfinder parts and dust exclusion from the inter of the camera is not a function of the fit between viewfinder lenses and respective covers.

BRIEF DESCRIPTION OF THE DRAWINGS

The above-mentioned and other features and objects of this invention and the manner of attaining them will become more apparent and the invention itself will be better understood by reference to the following description of an embodiment of the invention taken in conjunction with the accompanying figures wherein.

DETAILED DESCRIPTION OF THE INVENTION

Figure 1:
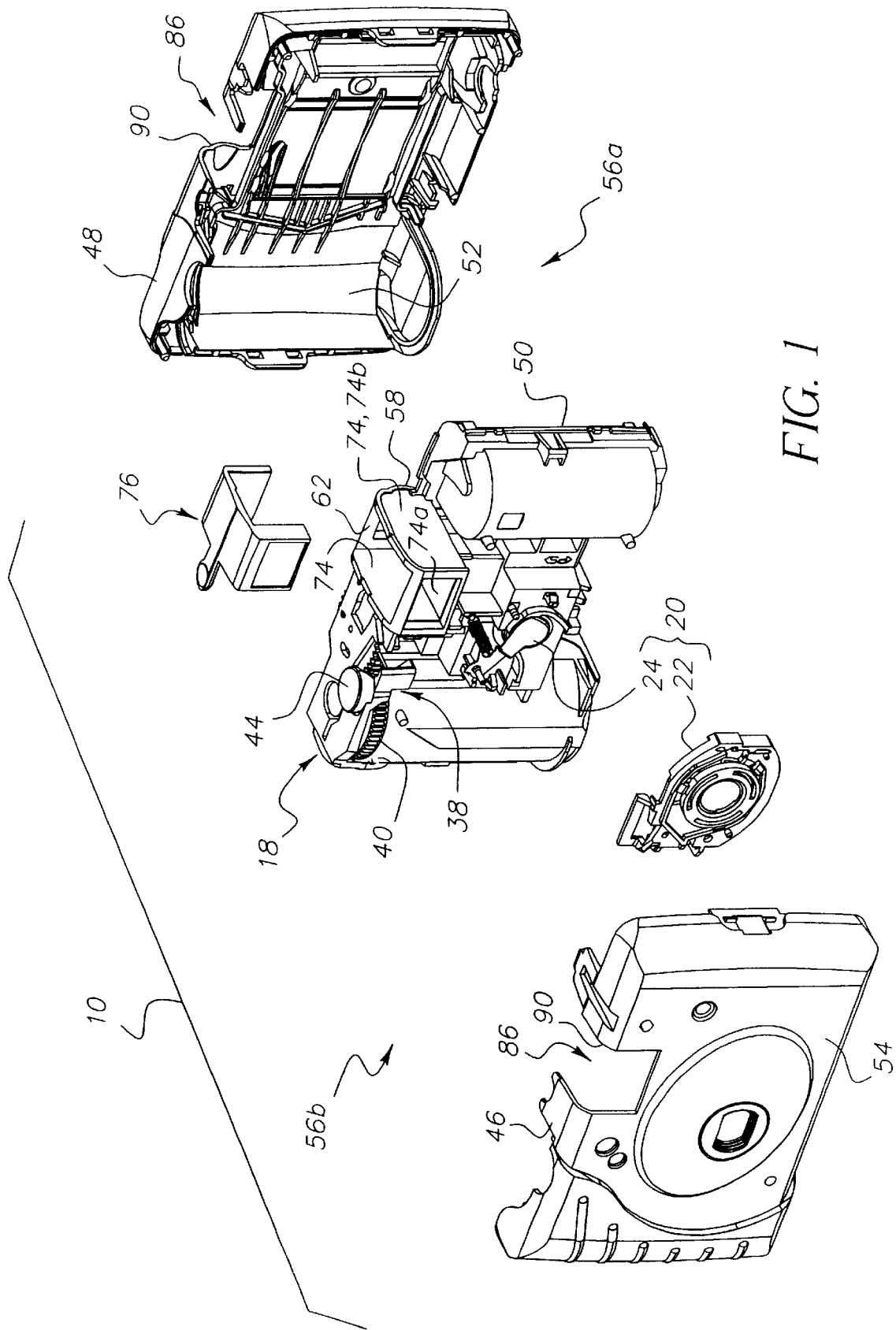
FIG. 1 is a front, exploded perspective view of an embodiment of the camera. The label is not shown.
Figure 2:
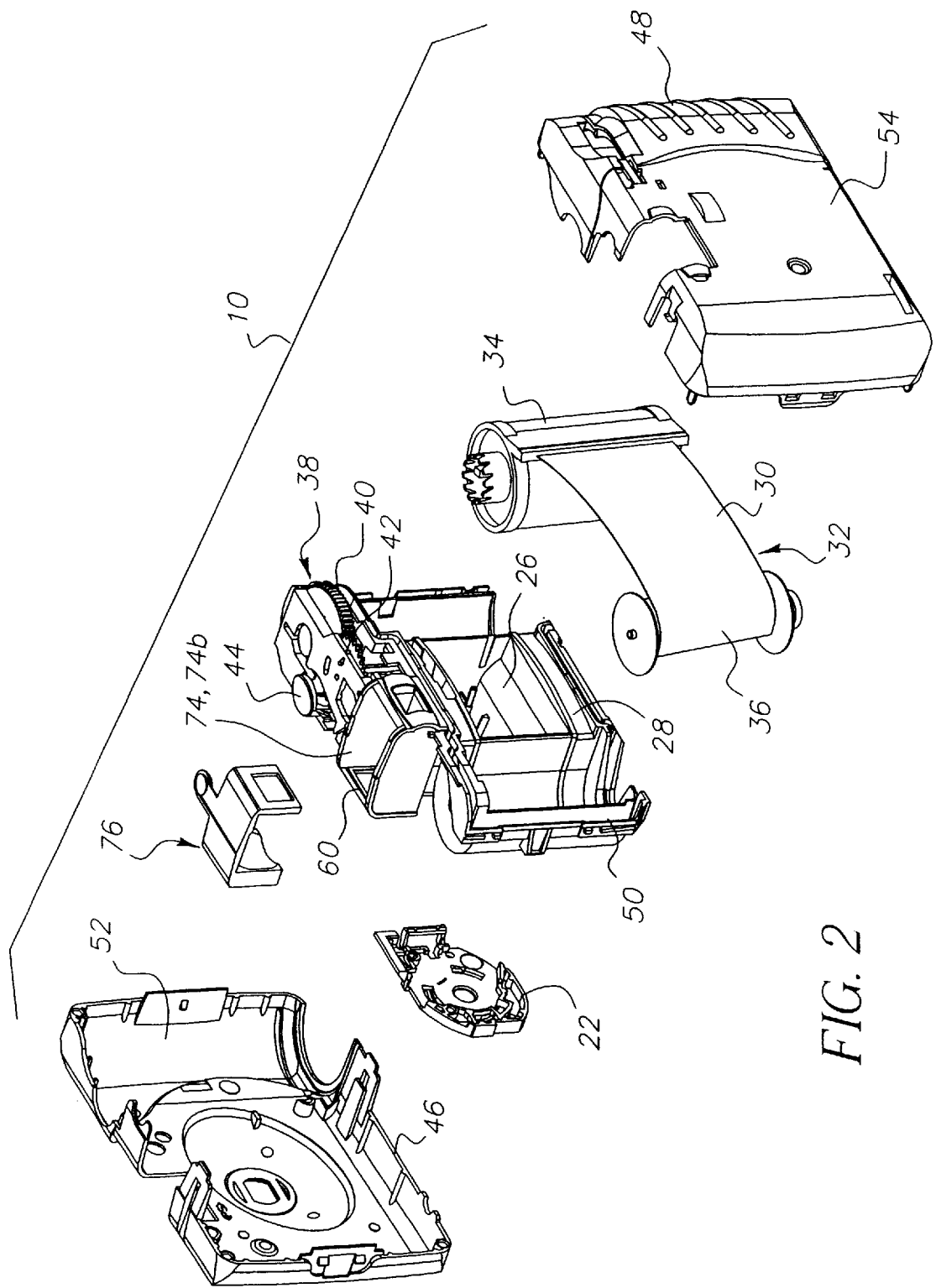
FIG. 2 is a rear, exploded perspective view of the camera of FIG. 1. The label is not shown.
Figure 3:
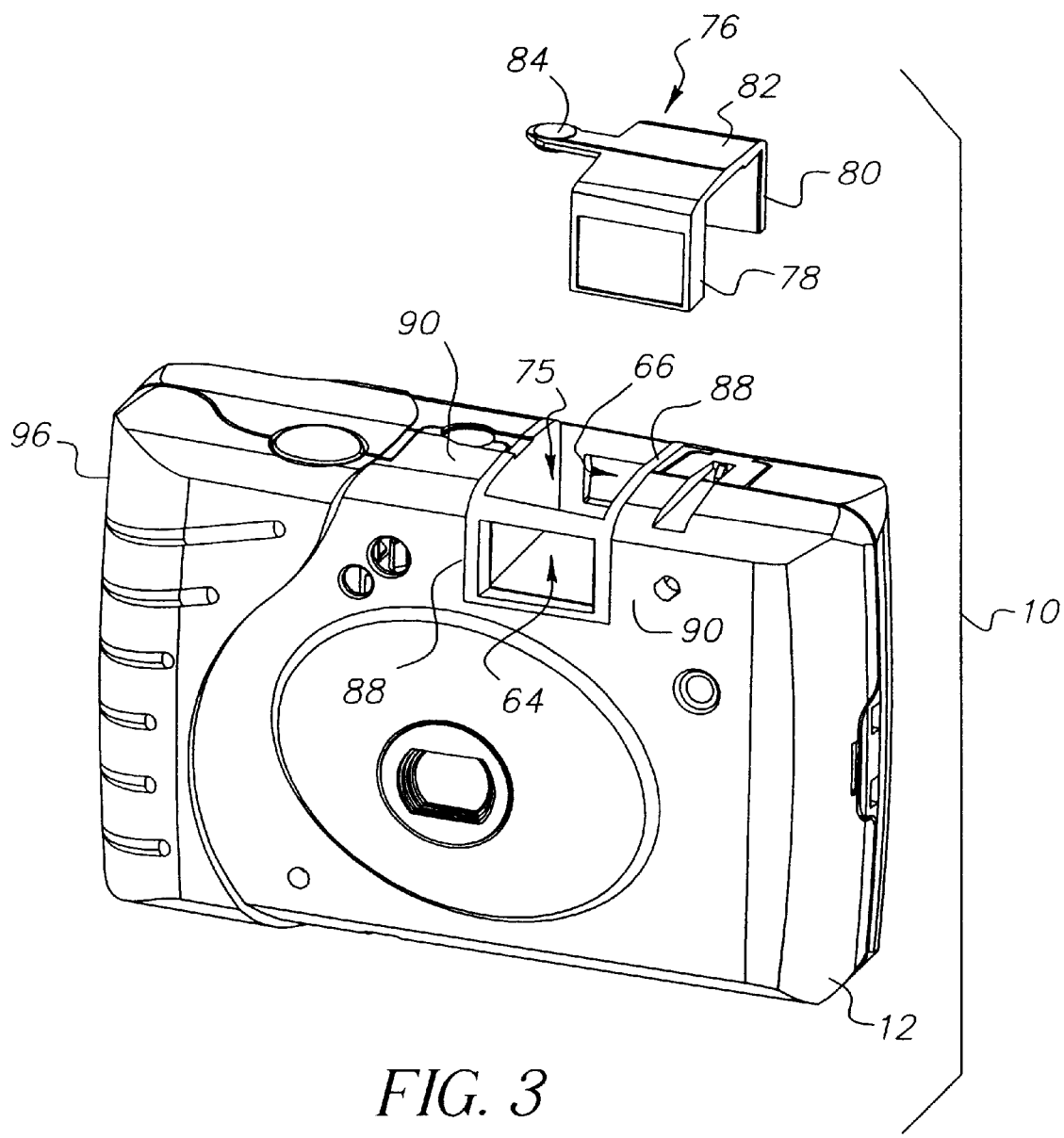
FIG. 3 is a front perspective view of the camera of FIG. 1. The viewfinder lens unit is shown separated from the remaining camera frame assembly. The label is not shown.

The camera 10 has a body 12, which has opposed front and rear faces 14,16. The body 12 holds a capture unit 18, which faces outward from the front face 14 and is used for the capture of light images. In the embodiment illustrated, the capture unit 18 captures light images on photographic film. Digital or hybrid film-digital capture units can be used in place of the photographic film capture unit 18 illustrated in the figures.

In the illustrated embodiments, the capture unit 18 has a shutter assembly 20, which includes a shutter plate 22 and a shutter 24. Under the shutter 24, an aperture (not shown) leads through a baffle 26 to an exposure frame 28. A filmstrip 30 of a film unit 32 is held in the exposure frame 28. The filmstrip 30 is advanced through the exposure frame 28 on a frame-by-frame basis for each image capture. In the one-time-use camera 10 shown, the filmstrip 30 is prewound out of a film canister 34 into a film roll 36 during camera assembly. The filmstrip 30 is advanced by a film transport 38, which includes a film advance 40, such as a thumbwheel, that is operated by the user. The film transport 38 incorporates a counterwheel 42 that is advanced by the thumbwheel 40 and has indicia (not illustrated) to indicate film usage. The shutter 24 is charged by the film transport 38. A shutter release 44 is tripped by the user to release the shutter for image exposure. Details and usage of suitable mechanisms providing these features and comparable features for a digital capture unit, are well known to those of skill in the art.

The body 12 has a front cover or front cover member 46 and a rear cover or rear cover member 48. A frame 50 is held between the covers 46,48. Most camera components are attached to the frame 50 or trapped between the frame 50 and covers 46,48. The covers 46,48 each have an inside surface 52 and an outside surface 54. The frame 50 is located in an internal cavity 56 between the front and rear covers 46,48. The internal cavity 56 is divided, by the frame 50, into a rear subcavity 56a that is light-tight and holds a film unit 32 and a front subcavity 56b that can be light-tight or can be subject to light admission. It is preferred that dust and other foreign materials be precluded from both subcavities.

The body 12 has a viewfinder box 58 that extends between the front and rear covers 46,48. The viewfinder box 58 has a front bezel 60 and a rear bezel 62. Each bezel 60,62 has a central opening 64,66, respectively. The central openings 64,66 are aligned and define a viewfinder axis 68 that points in the same direction as the optical axis 70 of the taking lens 72 of the capture unit 18. The viewfinder box 58 has a U-shaped sidewall 74 that has a bottom 74a and a pair of opposed lateral portions 74b. The sidewall 74 extends continuously between the bezels 60,62. The sidewall 74 and bezels 60,62 together form a trough having only the two central openings 64,66 and an upper opening 75 opposite the bottom 74a of the sidewall 74.

The viewfinder box 58 holds a viewfinder lens unit 76. The viewfinder lens unit 76 has a front optical element 78 and a rear optical element 80 that are joined together by a bridge 82 extending between the front and rear elements 78,80. One or both elements 78,80 can have an optical power. The front and rear elements 78,80 close respective central openings 64,66. The bridge 82 completely or partially closes the upper opening 75. The elements 78,80 and bridge 82 can be parts of a one-piece plastic casting. In the embodiment illustrated, that plastic casting also includes a magnifier 84 that is joined to and extends out from the bridge 82 of the viewfinder lens unit 76. The magnifier 84 is disposed over the indicia on the counterwheel 42.

The viewfinder box 58 is part of the front cover 46, or the rear cover 48, or the frame 50. In the embodiment shown in FIGS. 1–6, the viewfinder box 58 is part of the frame 50. In the embodiment shown in FIGS. 7–8, the viewfinder box 58 is part one of the covers 46,48. In the embodiment of FIGS. 1–6, both the front cover 46 and the rear cover 48 have slots 86, which receive respective ends of the viewfinder box 58. Alternatively, the viewfinder box 58 is part of one cover and the other cover has a slot 86, which receives the viewfinder box 58, and the frame 50 is cut away to permit passage of the viewfinder box 58. (In FIGS. 7–8, the slot 86 is in the rear cover 48 and the viewfinder box 58 is a part of the front cover 46.)

Each slot 86 extends between the inside surface 52 and outside surface 54 of the respective cover 46 or 48. The viewfinder box 58 can be assembled with the remainder of the respective member 46, 48, or 50; but for simplicity, is preferably a part of a one-piece plastic casting that includes the respective member.

Figure 6:
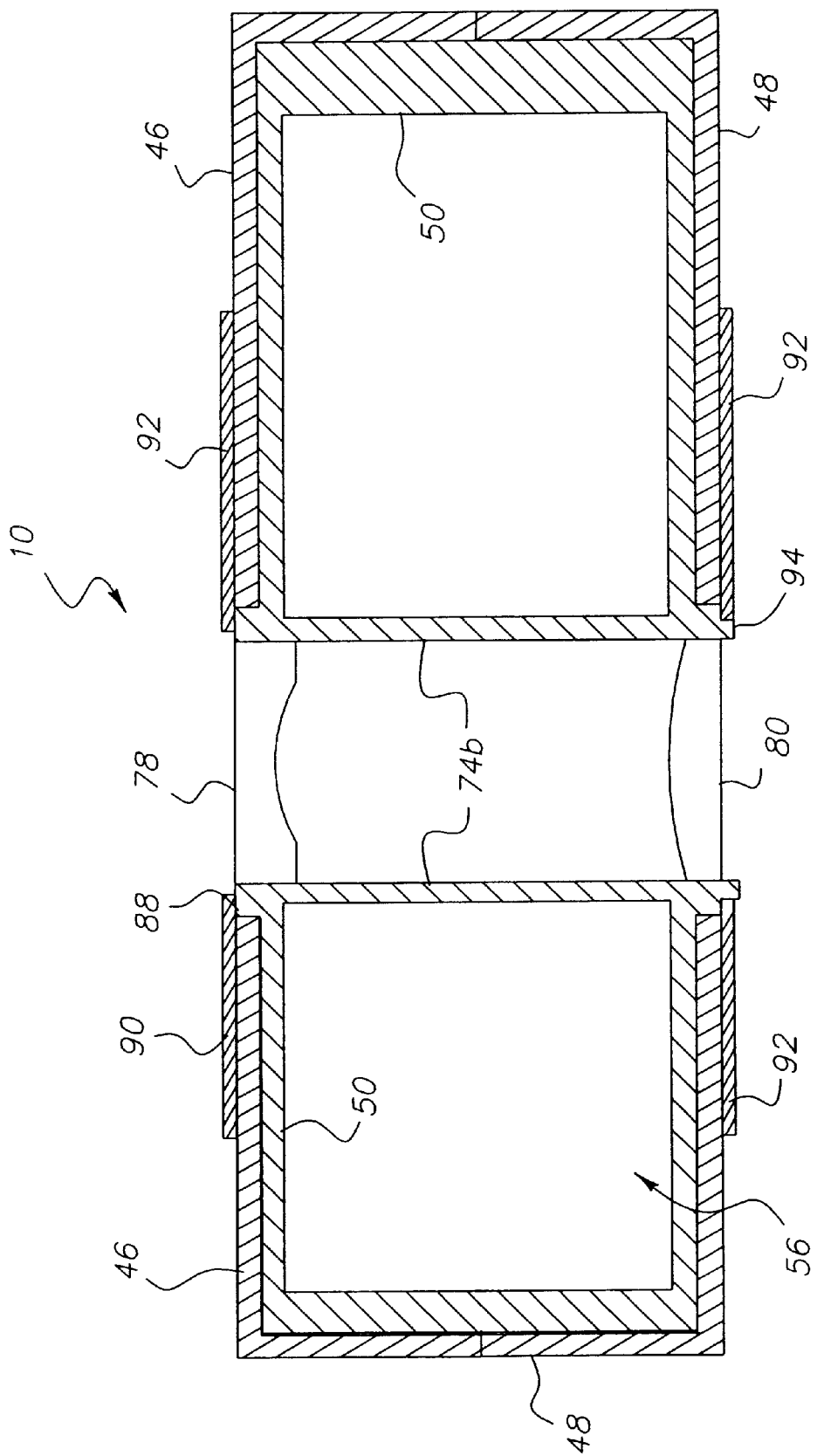
FIG. 6 is a semi-diagrammatical cross-sectional view of the camera of FIG. 1 taken substantially along line 6—6 of FIG. 5. For clarity, dimensions are changed, features are greatly simplified, and the only camera components shown are the viewfinder lens unit, the frame, the covers, and the label.
Figure 7:
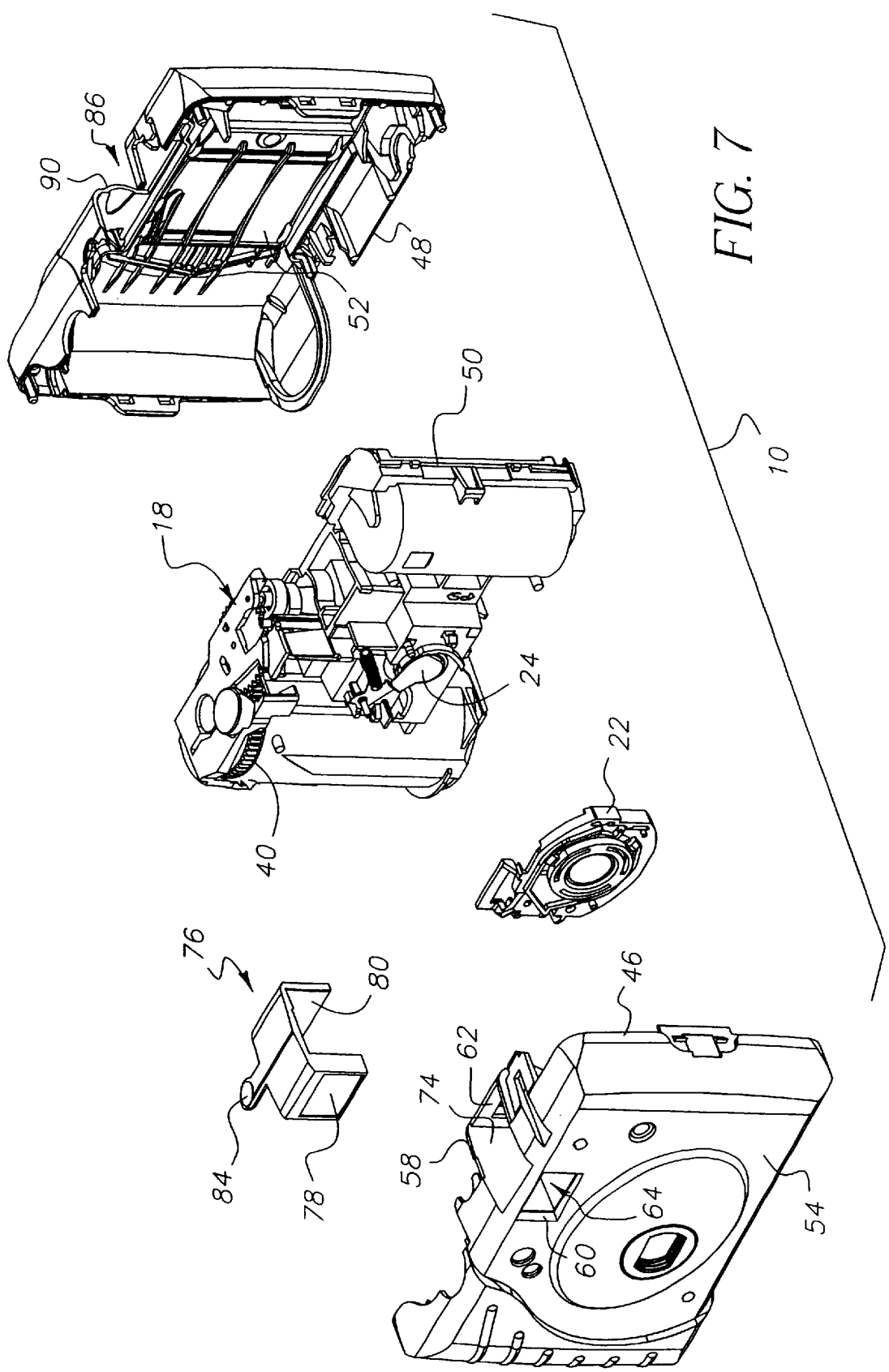
FIG. 7 is a front, exploded perspective view of another embodiment of the camera. The label is not shown.
Figure 8:
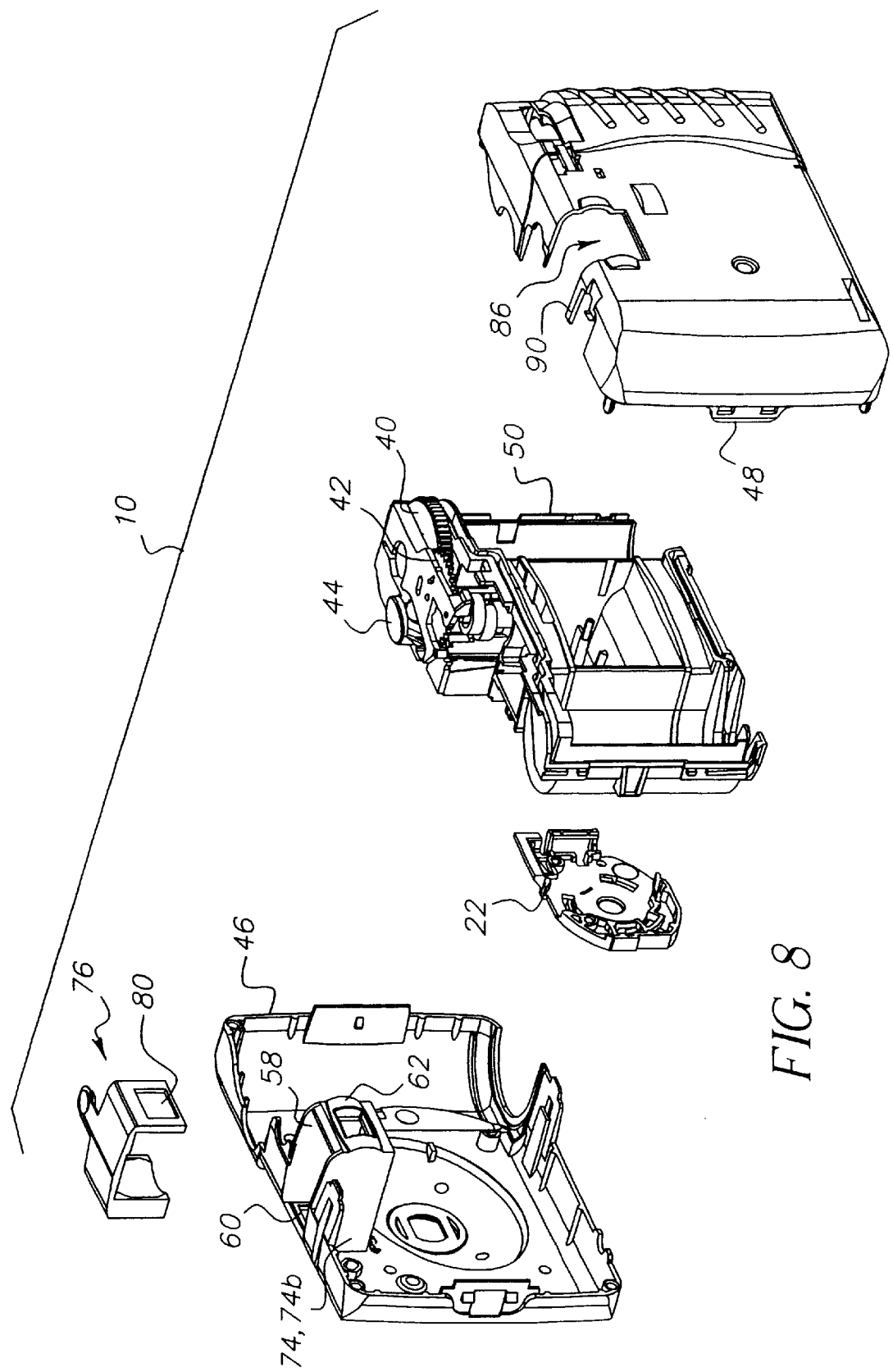
FIG. 8 is a rear, exploded perspective view of the camera of FIG. 7. The label is not shown.

The viewfinder box 58 has an free margin 88 where the viewfinder box 58 adjoins both covers 46,48 (shown in FIGS. 1–6) or one of the two covers 46,48 (shown in FIGS. 7–8). The free margin 88 closely fits an adjoining edge 90 of the cover or covers 46,48. The positioning and close fit of the viewfinder box 58 isolates the interior of the viewfinder box 58 and the viewfinder lens unit 76 within the viewfinder box 58 from the internal cavity 56 of the body 12.

Figure 4:
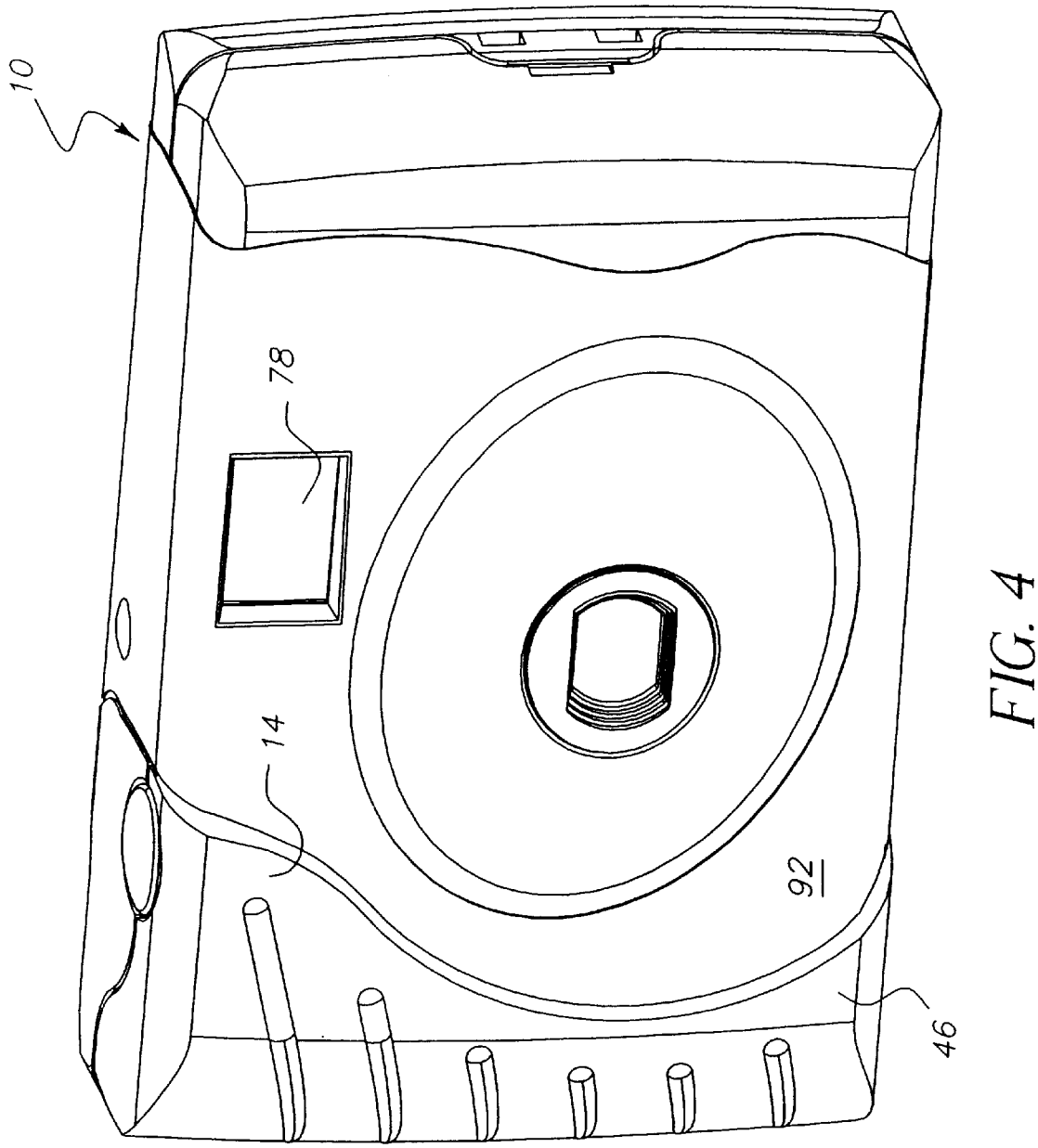
FIG. 4 is a front perspective of the camera of FIG. 1. The label is shown.
Figure 5:
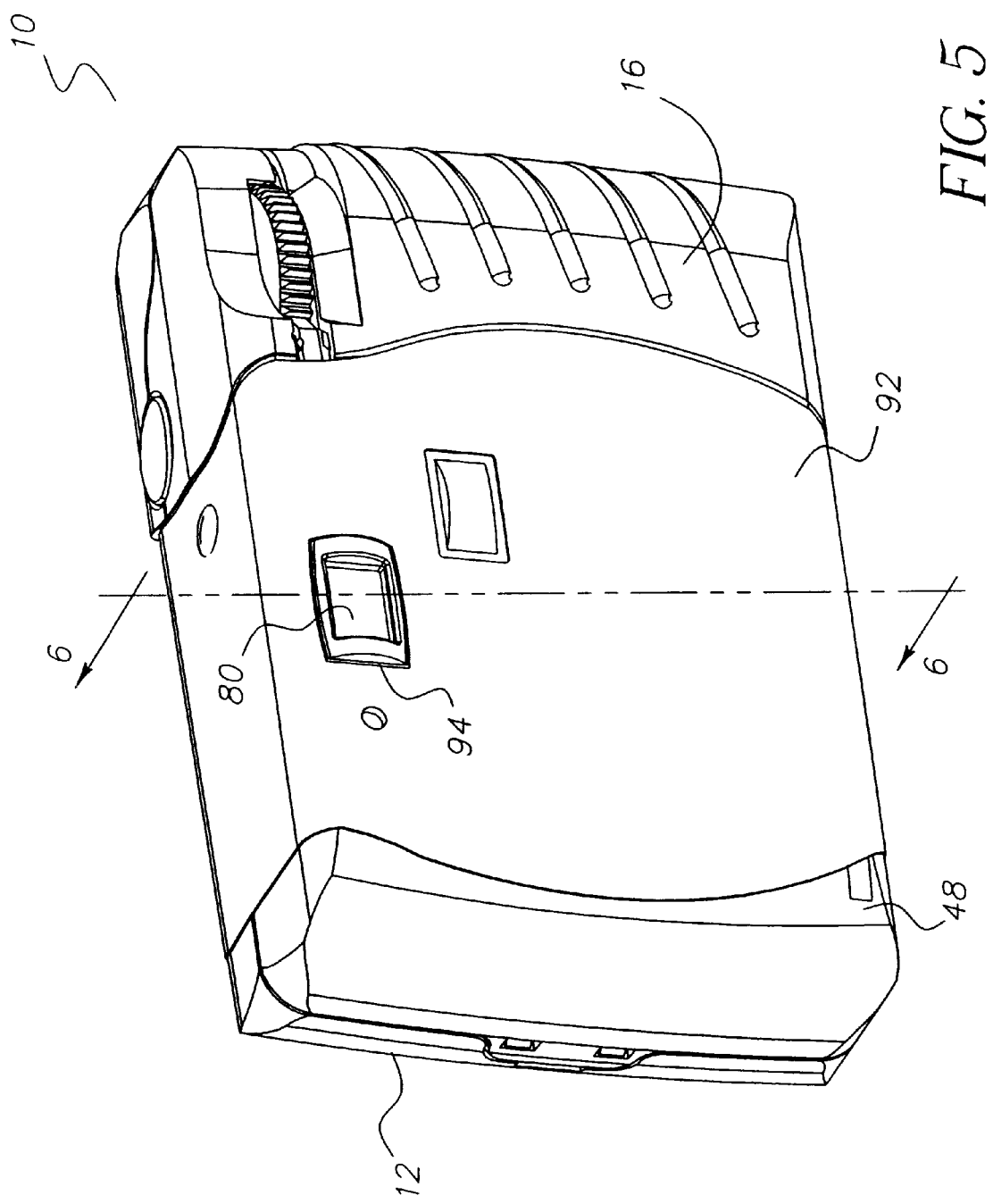
FIG. 5 is a rear perspective view of the camera of FIG. 1. The label is shown.

As shown in FIGS. 4–6, a label 92 is adhered to the body 12. The label 92 overlaps and seals the free margin 88 against entry of foreign material. In the embodiments shown, the label 92 is adhered to the free margin 88 and to adjoining edges 90 of the respective cover or covers 46,48. In order for this to occur uniformly along the free margin 88, the viewfinder box 58 extends through the slot 86 to or beyond the outside surface 54 of the respective cover 46,48. In the illustrated embodiments, the extreme rear 94 of the viewfinder box 58 extends through the slot 86 in the rear cover 48.

The viewfinder lens unit 76 can be friction fit in the viewfinder box 58 or can be held in by internal resilience. The label 92 can instead or additionally hold the viewfinder lens unit 76 within the viewfinder box 58, if desired. The label 92 may or may not be adhered to the bridge 82 of the viewfinder lens unit 76. With a transparent bridge 82, an adhered opaque label 92 can reduce flare.

Referring now to FIGS. 1–4, in an assembly method, a pair of cover members 46,48 are joined together over a frame member 50 and capture unit 18. This provides the body 12 having opposed front and rear faces 14,16 and internal cavity 56. During the joining, the viewfinder box 58 is inserted into slot 86 in one or more of the other members 46,48,50. The viewfinder lens unit 76 is then placed in a trough defined by the interior of viewfinder box 58. This position is external to the cavity 56 of the body 12. After the viewfinder lens unit 76 is installed, a label 92 can be adhered overlapping and sealing the free margin 88 of the viewfinder box 58. If desired, incomplete camera frame assemblies 96 can be stored for later assembly, prior to installation of a viewfinder lens unit 76, without risking dust entry at viewfinder openings. The assembly steps can be undertaken by hand, or automated equipment can be used.

The invention has been described in detail with particular reference to certain preferred embodiments thereof, but it will be understood that variations and modifications can be effected within the spirit and scope of the invention.

What is claimed is:

1. A camera comprising:

a capture unit;

a body holding said capture unit, said body having a front cover, a rear cover, and an internal cavity disposed between said covers, said body having a viewfinder box extending from an outer surface of one of said covers to an outer surface of the other said cover;

a viewfinder lens unit disposed in said viewfinder box.

2. The camera of claim 1 wherein said viewfinder lens unit is isolated from said internal cavity by said viewfinder box.

3. The camera of claim 1 wherein at least one of said covers has a slot and said viewfinder box extends into said slot.

4. The camera of claim 3 wherein said viewfinder box extends partially through said slot.

5. The camera of claim 1 wherein said viewfinder box has an free margin adjoining at least one of said covers and said camera further comprises a label adhered to said body, said label sealing said free margin.

6. The camera of claim 1 wherein said viewfinder box has a front bezel, a rear bezel, a sidewall having a bottom and a pair of opposed lateral portions, said bezels each having a central opening, said sidewall extending continuously between said bezels, said viewfinder box having an upper opening opposite said bottom; and said viewfinder lens unit includes a front lens, a rear lens, and a bridge extending between said front and rear lenses, said front and rear lenses closing respective said central openings, said bridge closing said upper opening.

7. The camera of claim 6 wherein said lenses and said bridge are of one-piece.

8. The camera of claim 7 further comprising a magnifier of one-piece with said bridge.

9. The camera of claim 1 wherein said viewfinder box is part of one of said covers.

10. The camera of claim 1 wherein one of said covers and said viewfinder box are a one-piece plastic casting.

11. The camera of claim 1 further comprising a frame disposed between said covers and wherein said capture unit is joined to said frame, and said viewfinder box is part of said frame.

12. The camera of claim 11 wherein said frame and said viewfinder box are a one-piece plastic casting.

13. The camera of claim 12 wherein said viewfinder lens unit is of one piece and includes a front lens, a rear lens, and a bridge extending between said front and rear lenses.

14. A camera comprising:
  a capture unit;
  a body holding said capture unit, said body having a front cover, a rear cover, and a frame, said body having an internal cavity disposed between said covers, said frame being disposed in said cavity, said body having a viewfinder box of one piece with one of said front cover, said rear cover, and said frame, one of said covers having an inside surface and an outside surface and a slot extending between said surfaces, said viewfinder box extending through said slot to said outside surface;
  a viewfinder lens unit disposed in said viewfinder box.

15. The camera of claim 14 wherein said viewfinder box has a free margin adjoining at least one of said covers and said camera further comprises a label adhered to said body, said label sealing said free margin.

16. The camera of claim 15 wherein said viewfinder lens unit is isolated from said internal cavity by said viewfinder box.

17. A method for assembling a camera comprising the steps of:
  joining a pair of cover members together over a frame member and capture unit to provide a body having opposed front and rear faces and an internal cavity;
  during said joining, inserting a viewfinder box into a slot in one of said cover members, said viewfinder box extending continuously between outer surfaces of said cover members, said viewfinder box and one of said members being a one-piece plastic casting, said slot being part of another of said members;
  placing a viewfinder lens unit in said viewfinder box.

18. The method of claim 17 wherein said viewfinder lens unit has a free margin adjoining said covers and said method further comprises adhering a label to said body, said label overlapping said free margin.

19. The method of claim 17 wherein said viewfinder box and one of said cover members are a one-piece plastic casting.

20. The method of claim 17 wherein said placing is external to said cavity.

* * * * *